United States Patent
Mitsuda

(10) Patent No.: US 7,626,792 B2
(45) Date of Patent: Dec. 1, 2009

(54) POWER SUPPLY CONTROL APPARATUS INCLUDING HIGHLY-RELIABLE OVERCURRENT DETECTING CIRCUIT

(75) Inventor: Tsuyoshi Mitsuda, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 173 days.

(21) Appl. No.: 10/885,045

(22) Filed: Jul. 7, 2004

(65) Prior Publication Data

US 2005/0013079 A1 Jan. 20, 2005

(30) Foreign Application Priority Data

Jul. 16, 2003 (JP) ............................. 2003-275128

(51) Int. Cl.
*H02H 3/08* (2006.01)

(52) U.S. Cl. .................................................. 361/93.1

(58) Field of Classification Search ................. 361/93.1
See application file for complete search history.

(56) References Cited

U.S. PATENT DOCUMENTS

| | | | | |
|---|---|---|---|---|
| 4,661,725 A * | 4/1987 | Chantepie | .................... | 326/115 |
| 5,272,392 A * | 12/1993 | Wong et al. | .................. | 327/109 |
| 5,422,593 A * | 6/1995 | Fujihira | ....................... | 327/561 |
| 5,504,448 A * | 4/1996 | Bennett et al. | ............... | 327/379 |
| 5,578,956 A * | 11/1996 | Rossi et al. | ................... | 327/309 |
| 5,631,551 A * | 5/1997 | Scaccianoce et al. | ........ | 323/313 |
| 5,642,251 A * | 6/1997 | Lebbolo et al. | ............... | 361/84 |
| 5,818,201 A * | 10/1998 | Stockstad et al. | ........... | 320/119 |
| 5,903,422 A * | 5/1999 | Hosokawa | ................. | 361/93.1 |
| 6,005,761 A * | 12/1999 | Izawa et al. | .................. | 361/103 |
| 6,052,016 A * | 4/2000 | Sugiura et al. | ............... | 327/393 |
| 6,198,343 B1 * | 3/2001 | Matsuoka | .................... | 327/543 |
| 6,204,648 B1 * | 3/2001 | Saeki et al. | .................. | 323/282 |
| 6,242,890 B1 * | 6/2001 | Sudo et al. | ................... | 320/128 |
| 6,396,311 B2 * | 5/2002 | Inn | .............................. | 327/70 |
| 6,608,520 B1 * | 8/2003 | Miyazaki | ..................... | 327/540 |
| 6,628,548 B1 * | 9/2003 | Hsu et al. | .............. | 365/185.21 |
| 6,683,765 B2 * | 1/2004 | Kanamori | ..................... | 361/18 |
| 6,693,415 B2 * | 2/2004 | Johnson | ....................... | 323/313 |
| 7,068,023 B2 * | 6/2006 | Okada | .......................... | 323/285 |

FOREIGN PATENT DOCUMENTS

| | | | | |
|---|---|---|---|---|
| DE | 43 16 275 | 11/1993 | | |
| DE | 690 25 278 | 9/1996 | | |
| DE | 198 25 029 | 12/1998 | | |
| JP | 01227520 | 9/1989 | | |
| JP | 01546049 | 6/1993 | | |
| JP | 6-180332 | 6/1994 | .............. | 324/76.11 |

* cited by examiner

*Primary Examiner*—Stephen W Jackson
*Assistant Examiner*—Ann T Hoang
(74) *Attorney, Agent, or Firm*—Young & Thompson

(57) ABSTRACT

In a power supply control apparatus for controlling supplying of power from a battery to a load including a battery terminal connectable to the battery, an output terminal connectable to the load, and a ground terminal, a transistor is connected between the battery terminal and the output terminal to turn ON and OFF a connection between the battery and the load. An overcurrent detecting circuit is connected between the battery terminal and the output terminal to detect whether or not an overcurrent has flown through the transistor. A control circuit is connected between the battery terminal and the ground terminal to activate the transistor and the overcurrent detecting circuit.

9 Claims, 9 Drawing Sheets

POWER SUPPLY CONTROL APPARATUS INCLUDING HIGHLY-RELIABLE OVERCURRENT DETECTING CIRCUIT

DESCRIPTION OF THE INVENTION

1. Field of the Invention

The present invention relates to a power supply control apparatus for controlling supplying of power from a battery to a load of a vehicle, and more particularly, the improvement of the overcurrent detecting circuit thereof.

2. Description of the Related Art

A prior art power supply control apparatus for controlling supplying of power from a battery to a load includes at least three terminals, i.e., a battery terminal connectable to the battery, an output terminal connectable to the load, and a ground terminal. An output transistor is connected between the battery terminal and the output terminal, to turn ON and OFF a connection between the battery and the load. On the other hand, an overcurrent detecting circuit is connected between the battery terminal and the ground terminal to detect whether or not an overcurrent has flowed through the output transistor. Also, a control circuit is connected between the battery terminal and the ground terminal to activate the output transistor and the overcurrent detecting circuit (see: JP-A-6-180332). This will be explained later in detail.

In the above-described prior art power supply control apparatus, however, when the control circuit is operated, so that the voltage at the ground terminal is increased, the overcurrent detecting circuit would not be operated, since the overcurrent detecting circuit is connected to the ground terminal. Also, it is difficult to obtain a high precision overcurrent detection. Further, the apparatus is large in size and high in manufacturing cost. Additionally, switching noise would be generated when the output transistor is turned ON and OFF. This also will be explained later in detail.

SUMMARY OF THE INVENTION

It is an object of the present invention to provide a power supply control apparatus including a highly-reliable overcurrent detecting circuit.

According to the present invention, in a power supply control apparatus for controlling supplying of power from a battery to a load, including a battery terminal connectable to the battery, an output terminal connectable to the load, and a ground terminal, a transistor is connected between the battery terminal and the output terminal, to turn ON and OFF connection between the battery and the load. An overcurrent detecting circuit is connected between the battery terminal and the output terminal to detect whether or not an overcurrent has flowed through the transistor. A control circuit is connected between the battery terminal and the ground terminal to activate the transistor and the overcurrent detecting circuit.

Since the overcurrent detecting circuit is not connected to the ground terminal, even when the control circuit is operated so that the voltage at the ground terminal is increased, the overcurrent detecting circuit can be surely operated.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, prior art power supply control apparatuses will be explained with reference to FIGS. 1 and 2.

Figure 1:
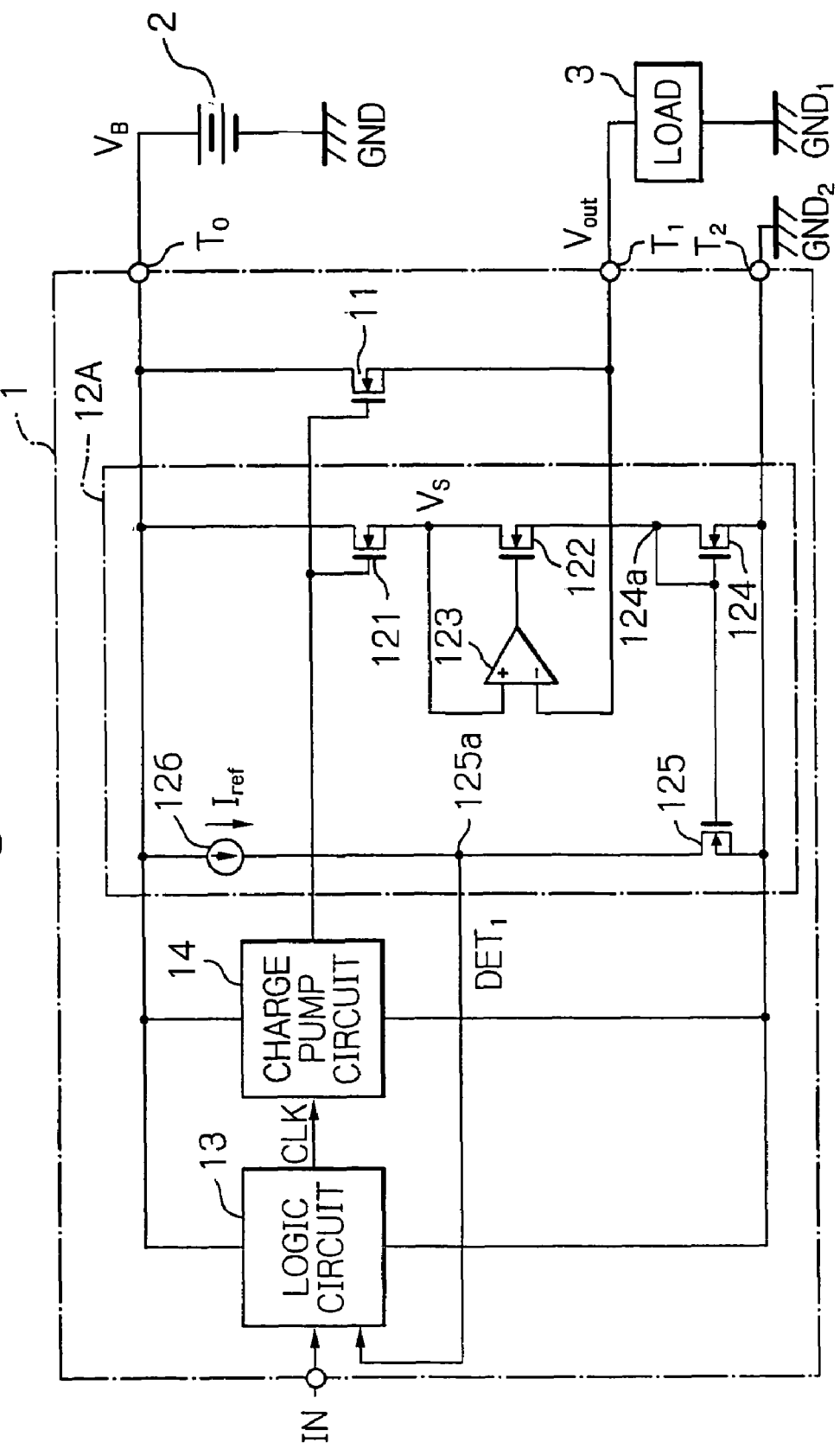
FIG. 1 is a circuit diagram illustrating a first prior art power supply control apparatus.

In FIG. 1, which illustrates a first prior art power supply control apparatus, a power supply control apparatus 1 has a battery terminal $T_0$ connected to a battery 2 whose voltage is denoted by $V_B$, an output terminal $T_1$ connected to a load 3 such as a starter or a lamp, and a ground terminal $T_2$. Note that the load 3 and the ground terminal $T_2$ are grounded at a body of a vehicle; however, the load 3 and the ground terminal $T_2$ are generally grounded at different grounded places $GND_1$ and $GND_2$, respectively, of the vehicle.

The power supply control apparatus 1 of FIG. 1 is constructed by an output MOS transistor 11 connected between the battery terminal $T_0$ and the output terminal $T_1$ for turning ON and OFF a connection between the battery 2 and the load 3, an overcurrent detecting circuit 12A connected between the battery terminal $T_0$ and the ground terminal $T_2$ for detecting an overcurrent flowing through the output MOS transistor 11, and a control circuit formed by a logic circuit 13 and a charge pump circuit 14 connected between the battery terminal $T_0$ and the ground terminal $T_2$. In this case, the overcurrent detecting circuit 12A generates a current type overcurrent detecting signal $DET_1$.

The logic circuit 13 receives an input signal IN to generate a clock signal CLK. When the charge pump circuit 14 is activated by the clock signal CLK, the charge pump circuit 14 turns ON the output MOS transistor 11 and the overcurrent detecting circuit 12A. On the other hand, when the overcurrent detecting circuit 12A detects an overcurrent flowing through the output MOS transistor 11 due to a short-circuited state between the output terminal $T_1$ and the ground terminal $T_2$ or within the load 3, and an overcurrent detecting signal $DET_1$ is also transmitted from the overcurrent detecting circuit 12A to the logic circuit 13, supplying of the clock signal CLK is stopped. As a result, the charge pump circuit 14 is deactivated to turn OFF the output MOS transistor 11 and the overcurrent detecting circuit 12A.

The overcurrent detecting circuit 12A is constructed by a current detecting MOS transistor 121 analogous to the output MOS transistor 11. The current detecting MOS transistor 121 is turned ON by the charge pump circuit 14. In this case, if the ratio of the gate width of the output MOS transistor 11 to that of the current detecting MOS transistor 121 is 1000:1, the ratio of a current flowing through the output MOS transistor 11 to a current flowing through the current detecting MOS transistor 121 is 1000:1. For example, the former current is 1 A and the latter current is 1 mA.

The overcurrent detecting circuit 12A is further constructed by a current mirror circuit formed by analogous MOS transistors 124 and 125 having an input 124a; connected to the control MOS transistor 122 and an output 125a connected to a constant current source 126. In this case, the ratio of the gate width of the MOS transistor 124 to that of the MOS transistor 125 is 1:1. Also, a current flowing through the constant current source 126 is 1.1 mA.

The overcurrent detecting circuit 12A is further constructed by a current mirror circuit formed by analogeous MOS transistors 124 and 125 having an input 124a connected to the control MOS transistor 122 and an output 125a connected to a constant current source 126. In this case, the ratio of the gate width of the MOS transistor 124 to that of the MOS transistor 125 is 1:1. Also, a current flowing through the constant current source 126 is 1.1 mA.

The operation of the power supply control apparatus 1 of FIG. 1 is explained next.

In a deactivated state of the charge pump circuit 14, no current flows through the output MOS transistor 11 and the current detecting MOS transistor 121. Therefore, no current flows through the control MOS transistor 122 and the MOS transistor 124, so that no current flows through the MOS transistor 125. As a result, the current (=1.1 mA) of the constant current source 126 is entirely supplied as the overcurrent detecting signal $DET_1$ to the logic circuit 13, so that the overcurrent detecting signal DET, becomes "1" (high level).

In an activated state of the charge pump circuit 14, if no short-circuited state occurs between the output terminal $T_1$ and the ground terminal $T_2$ or within the load 3, a normal current such as 1 A flows through the output MOS transistor 11, so that a normal detecting current such as 1 mA flows through the current detecting MOS transistor 121, the control MOS transistor 122 and the MOS transistor 124. Therefore, a current of 1 mA flows through the MOS transistor 125. As a result, a difference in current between the constant current source 126 and the MOS transistor 125, i.e., a current of +0.1 mA (=1.1 mA-1.0 mA) is supplied as the overcurrent detecting signal $DET_1$ to the logic circuit 13, so that the overcurrent detecting signal $DET_1$ also becomes "1" (high level).

In an activated state of the charge pump circuit 14, if a short-circuited state occurs between the output terminal $T_1$ and the ground terminal $T_2$ or within the load 3, an abnormal current such as 1.2 A flows through the output MOS transistor 11, so that an abnormal detecting current such as 1.2 mA flows through the current detecting MOS transistor 121, the control MOS transistor 122 and the MOS transistor 124. Therefore, a current of 1.2 mA flows through the MOS transistor 125. As a result, a difference in current between the constant current source 126 and the MOS transistor 125, i.e., a current of −0.1 mA (=1.1 mA-1.2 mA) is supplied as the overcurrent detecting signal $DET_1$ to the logic circuit 13, so that the overcurrent detecting signal $DET_1$ becomes "0" (low level). In this case, the logic circuit 13 stops supplying the clock signal $CLK$, to deactivate the pump charge circuit 14, thus turning OFF the output MOS transistor 11 and the current detecting MOS transistor 121.

In the power supply control apparatus 1 of FIG. 1, however, when the logic circuit 13, the charge pump circuit 14 and the like are operated, a current may be supplied therefrom via the ground terminal $T_2$ to the ground $GND_2$. In this case, if a parasitic resistance included in the power supply control apparatus 1 of FIG. 1 and the ground $GND_2$ is so large that the source voltage of the MOS transistors 124 and 125 would be higher than the voltage at the ground $GND_1$, and also, the source voltage of the MOS transistors 124 and 125 would be higher than the output voltage $V_{out}$ at the output terminal $T_1$. As a result, no current would flow through the MOS transistor 124, and also, the operational amplifier 123 could not be operated. Thus, the overcurrent detecting circuit 12A could not be operated.

Also, a current $I_{DET}$ of the overcurrent detecting signal $DET_1$ is proportional to a reference current $I_{ref}$ flowing through the constant current source 126, i.e., $$I_{DET} = \alpha \cdot I_{ref} \quad (1)$$

where α is the ratio of the gate width of the output MOS transistor 11 to that of the current detecting MOS transistor 121. Therefore, if the current $I_{ref}$ of the constant current source 126 fluctuates, it is difficult to obtain a high precision overcurrent detection.

Further, since the operational amplifier 123 is provided, the power supply control apparatus 1 of FIG. 1 is large in size and high in manufacturing cost.

Additionally, since the overcurrent detecting signal $DET_1$ is controlled by the feedback operation using the operational amplifier 123, the overcurrent detecting signal $DET_1$ is subject to the battery voltage $V_B$. Therefore, if the distance between the power supply control apparatus 1 of FIG. 1 and the battery 2 is very long, long wire-harness having a large inductance is required therebetween, which would generate switching noise when the output MOS transistor 11 is turned ON and OFF.

Figure 2:
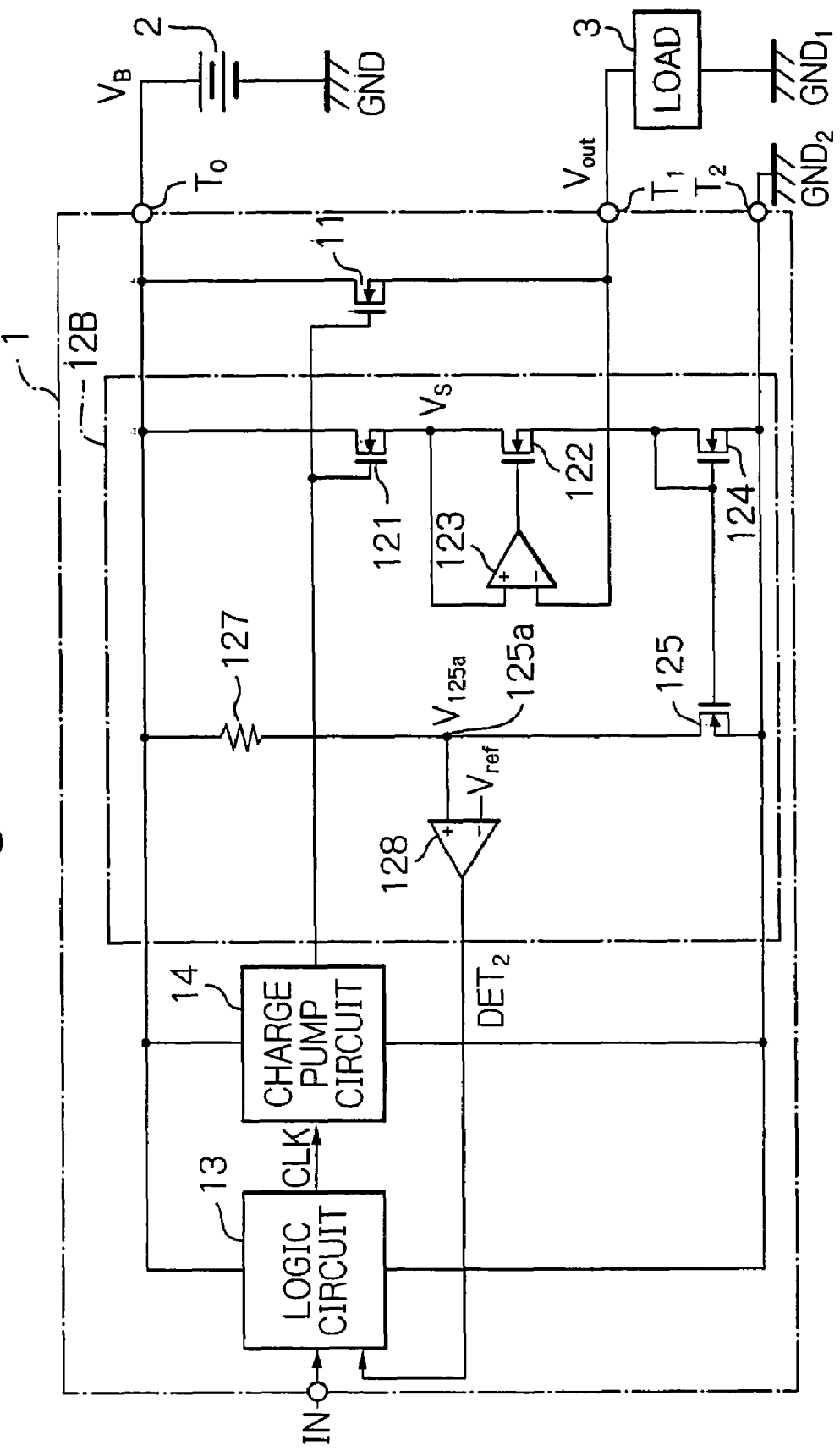
FIG. 2 is a circuit diagram illustrating a second prior art power supply control apparatus.

In FIG. 2, which illustrates a second prior art power supply control apparatus, the overcurrent detecting circuit 12A of FIG. 1 is replaced by an overcurrent detecting circuit 12B where the constant current source 126 of FIG. 1 is replaced by a reference resistor 127 and a comparator 128 for comparing the voltage at the output of the current mirror circuit (124, 125) with a reference voltage $V_{ref}$ is added. In this case, the reference voltage $V_{ref}$ is defined by $$V_B - 1.2 \text{ mA} \cdot R_{ref} < V_{ref} < V_B - 1.0 \text{ mA} \cdot R_{ref}$$

where $R_{ref}$ is a resistance of the reference resistor 127. Therefore, the overcurrent detecting circuit 12B generates a voltage type overcurrent detecting signal $DET_2$.

The operation of the power supply control apparatus 1 of FIG. 2 is explained next.

In a deactivated state of the charge pump circuit 14, no current flows through the output MOS transistor 11 and the current detecting MOS transistor 121. Therefore, no current flows through the control MOS transistor 122 and the MOS transistor 124, so that no current flows through the MOS transistor 125. As a result, the voltage $V_{125a}$ at the output 125a of the current mirror circuit (124, 125) becomes $$V_{125a} = V_B > V_{ref}$$

Therefore, the overcurrent detecting signal $DET_2$ becomes "1" (high level).

In an activated state of the charge pump circuit 14, if no short-circuited state occurs between the output terminal $T_1$ and the ground terminal $T_2$ or within the load 3, a normal current such as 1 A flows through the output MOS transistor 11, so that a normal detecting current such as 1 mA flows through the current detecting MOS transistor 121, the control MOS transistor 122 and the MOS transistor 124. Therefore, a current of 1 mA flows through the MOS transistor 125. As a result, the voltage $V_{125a}$ at the output 125a of the current mirror circuit (124, 125) becomes $$V_{125a} = V_B - 1.0 \text{ mA} \cdot R_{ref} > V_{ref}$$

Therefore, the overcurrent detecting signal $DET_2$ also becomes "1" (high level).

In an activated state of the charge pump circuit 14, if a short-circuited state occurs between the output terminal $T_1$ and the ground terminal $T_2$ or within the load 3, an abnormal current such as 1.2 mA flows through the output MOS transistor 11, so that an abnormal detecting current such as 1.2 mA flows through the current detecting MOS transistor 121, the control MOS transistor 122 and the MOS transistor 124. Therefore, a current of 1.2 mA flows through the MOS transistor 125. As a result, the voltage $V_{125a}$ at the output 125a of the current mirror circuit (124, 125) becomes $$V_{125a} = V_B - 1.2 \text{ mA} \cdot R_{ref} < V_{ref}$$

Therefore, the overcurrent detecting signal $DET_2$ becomes "0" (low level). In this case, the logic circuit 13 stops supplying of the clock signal CLK, to deactivate the pump charge circuit 14, thus turning OFF the output MOS transistor 11 and the current detecting MOS transistor 121.

Even in the power supply control apparatus 1 of FIG. 2, when the logic circuit 13, the charge pump circuit 14 and the like are operated, a current may be supplied therefrom via the ground terminal $T_2$ to the ground $GND_2$. In this case, if a parasitic resistance included in the power supply control apparatus 1 of FIG. 2 and the ground $GND_2$ is so large that the source voltage of the MOS transistors 124 and 125 would be higher than the voltage at the ground $GND_1$, and also, the source voltage of the MOS transistors 124 and 125 would be higher than the output voltage $V_{out}$ at the output terminal $T_1$. As a result, no current would flow through the MOS transistor 124, and also, the operational amplifier 123 could not be operated. Thus, the overcurrent detecting circuit 12B could not be operated.

Also, since a current $I_{DET}$ of the overcurrent detecting signal $DET_2$ is proportional to the ratio of the reference voltage $V_{ref}$ to the resistance $R_{ref}$ of the reference resistor 127, i.e., $$I_{DET} = \alpha \cdot V_{ref}/R_{ref} \quad (2)$$

Therefore, if the resistance $R_{ref}$ of the reference resistor 127 fluctuates, it is difficult to obtain a high precision overcurrent detection.

Further, since the operational amplifier 123 is provided, the power supply control apparatus 1 of FIG. 2 is large in size and high in manufacturing cost.

Additionally, since the overcurrent detecting signal $DET_2$ is controlled by the feedback operation using the operational amplifier 123, the overcurrent detecting signal $DET_2$ is subject to the battery voltage $V_B$. Therefore, if the distance between the power supply control apparatus 1 of FIG. 2 and the battery 2 is very long, a long wire-harness having a large inductance is required therebetween, which would generate switching noise when the output MOS transistor 11 is turned ON and OFF.

Figure 3:
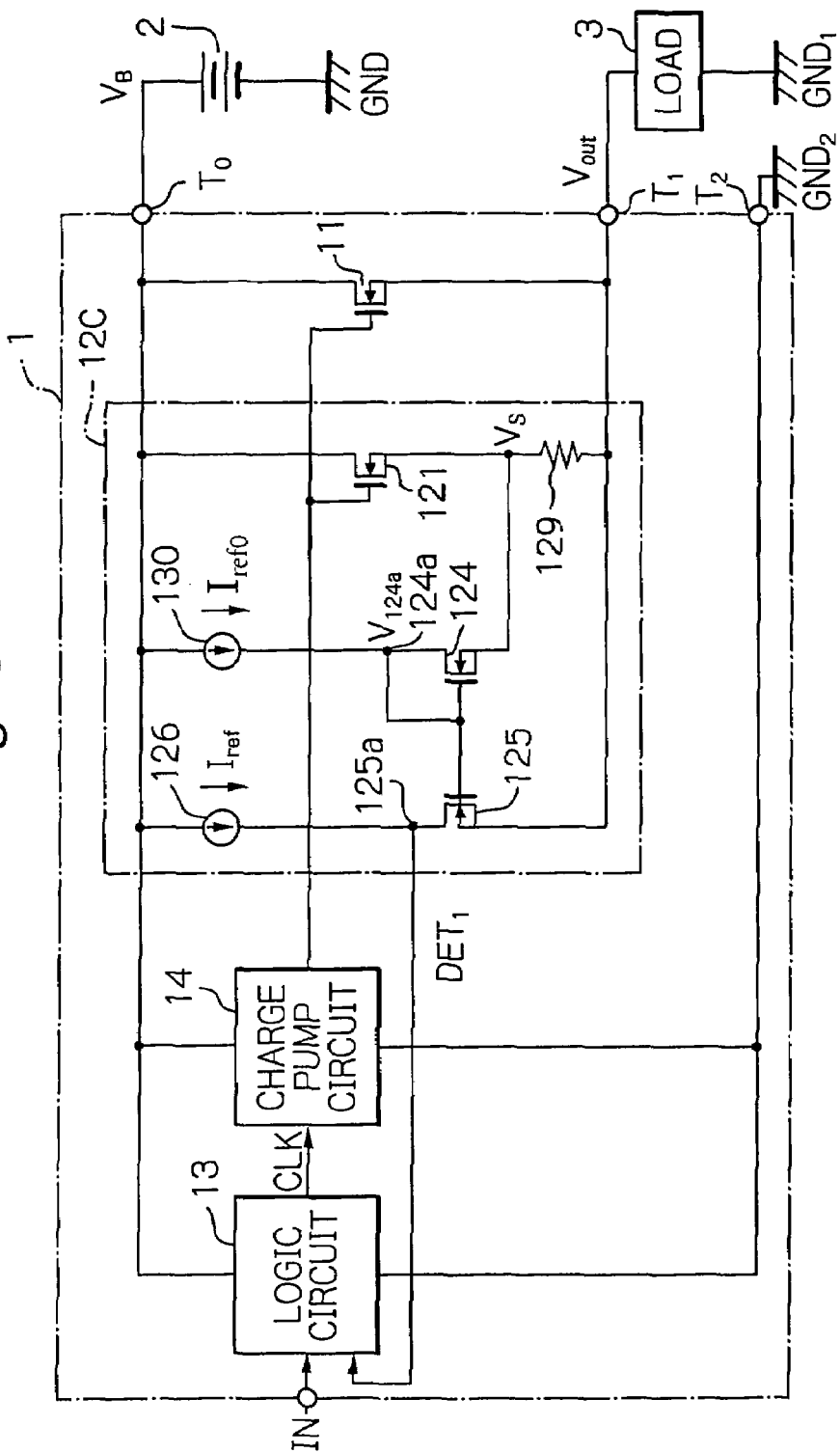
FIG. 3 is a circuit diagram illustrating a first embodiment of the power supply control apparatus according to the present invention.

In FIG. 3, which illustrates a first embodiment of the power supply control apparatus according to the present invention, the overcurrent detecting circuit 12A of FIG. 1 is replaced by an overcurrent detecting circuit 12C which is connected between the battery terminal $T_0$ and the output terminal $T_1$.

In the overcurrent detecting circuit 12C, the control MOS transistor 122 and the operational amplifier 123 of FIG. 1 are deleted, and a reference resistor 129 is connected between the current detecting MOS transistor 121 and the output terminal $T_1$. Also, a constant current source 130 is connected to the battery terminal $T_0$, and the MOS transistor 124 of FIG. 1 is connected between the constant current source 130 and the reference resistor 129. Also, the source of the MOS transistor 125 is connected to the output terminal $T_1$.

In the overcurrent detecting circuit 12C, the current flowing through the current detecting MOS transistor 121 is subject to an error caused by a voltage drop of the reference resistor 129. Note that, the smaller this voltage drop, the smaller the error of the current flowing through the current detecting MOS transistor 121. In this case, it is desirable that this voltage drop is less than 0.5V.

In the current mirror circuit formed by the MOS transistors 124 and 125, since the reference resistor 129 is connected to the source of the MOS transistor 124, the source voltage of the MOS transistor 124 is different from the source voltage of the MOS transistor 125. In order for the current flowing through the MOS transistor 124 to be equal to the current flowing through the MOS transistor 125, W/L:W0/L0=1:1, and $I_{ref} > I_{ref0}$ where W0 and W are the gate width of the MOS transistors 124 and 125, respectively;

L0 and L are the gate lengths of the MOS transistors 124 and 125, respectively; and $I_{ref0}$ and $I_{ref}$ are the currents of the constant current sources 130 and 129, respectively.

Otherwise, $I_{ref} = I_{ref0}$, and

W/L<W0/L0

As a result, if the current flowing through the MOS transistor 124 is 1 mA, the current flowing through the MOS transistor 125 is also 1 mA.

The operation of the power supply control apparatus 1 of FIG. 3 is explained next.

In a deactivated state of the charge pump circuit 14, no current flows through the output MOS transistor 11 and the current detecting MOS transistor 121. Therefore, no current flows through the reference resistor 129 so that the source voltage $V_S$ of the current detecting MOS transistor 121 does not rise, and thus, the voltage $V_{124a}$ at the input 124a of the current mirror circuit does not rise. As a result, no current flows through the MOS transistor 125, so that the current (=1.1 mA) of the constant current source 126 is entirely supplied as the overcurrent detecting signal $DET_1$ to the logic circuit 13, so that the overcurrent detecting signal $DET_1$ becomes "1" (high level).

In an activated state of the charge pump circuit 14, if no short-circuited state occurs between the output terminal $T_1$ and the ground terminal $T_2$ or within the load 3, a normal current such as 1 A flows through the output MOS transistor 11, so that a normal detecting current such as 1 mA flows through the current detecting MOS transistor 121, and the reference resistor 129. Thus, the source voltage $V_S$ of the current detecting MOS transistor 121 and the voltage $V_{124a}$ at the input of the current mirror circuit rise. In this case, however, the current flowing through the MOS transistor 125 does not exceed 1.1 mA. As a result, a positive difference in current between the constant current source 126 and the MOS transistor 125 is supplied as the overcurrent detecting signal $DET_1$ to the logic circuit 13, so that the overcurrent detecting signal $DET_1$ also becomes "1" (high level).

In an activated state of the charge pump circuit 14, if a short-circuited state occurs between the output terminal $T_1$ and the ground terminal $T_2$ or within the load 3, an abnormal current such as 1.2 A flows through the output MOS transistor 11, so that an abnormal detecting current such as 1.2 mA flows through the current detecting MOS transistor 121 and the reference resistor 129. Thus, the source voltage $V_S$ of the current detecting MOS transistor 121 and the voltage $V_{124a}$ at the input of the current mirror circuit rise. In this case, the current flowing through the MOS transistor 125 exceeds 1.1 mA. As a result, a negative difference in current between the constant current source 126 and the MOS transistor 125 is supplied as the overcurrent detecting signal $DET_1$ to the logic circuit 13, so that the overcurrent detecting signal $DET_1$ becomes "0" (low level). In this case, the logic circuit 13 stops supplying of the clock signal CLK, to deactivate the pump charge circuit 14, thus turning OFF the output MOS transistor 11 and the current detecting MOS transistor 121.

In the power supply control apparatus 1 of FIG. 3, when the logic circuit 13, the charge pump circuit 14 and the like are operated, a current may be supplied therefrom via the ground terminal $T_2$ to the ground $GND_2$. Even in this case, the source voltages of the MOS transistors 124 and 125 are the same or close to the output voltage $V_{out}$ at the output terminal $T_1$. Thus, the overcurrent detecting circuit 12C could be surely operated.

Also, a current $I_{DET}$ of the overcurrent detecting signal $DET_1$ depends on a square root of reference currents $I_{ref}$ and $I_{ref0}$ flowing through the constant current sources 126 and 130, i.e., $$I_{DET}=(\alpha/R_{ref})\cdot\{((I_{ref}/I_{ref0})\cdot(W0/L0)/(W/L))^{1/2}-1\}\cdot\{V_{gs}(124)-V_{th}(124)\} \quad (3)$$

where $V_{gs}(124)$ is the gate-to-source voltage of the MOS transistor 124; and $V_{th}(124)$ is the threshold voltage of the MOS transistor 124.

In this case, $$V_{gs}(124) \propto (I_{ref0})^{1/2}$$

Therefore, the equation (3) is approximated to $$I_{DET} \propto (I_{ref0})^{1/2}.$$

Thus, even if the currents $I_{ref}$ and $I_{ref0}$ of the constant current sources 126 and 130 fluctuate, a high precision overcurrent detection can be obtained.

Further, since the operational amplifier 123 of FIG. 1 is not provided, the power supply control apparatus 1 of FIG. 3 can be small in size and low in manufacturing cost.

Additionally, since the overcurrent detecting signal $DET_1$ does not require a feedback operation using the operational amplifier 123, the overcurrent detecting signal $DET_1$ is not subject to the battery voltage $V_B$. Therefore, even if the distance between the power supply control apparatus 1 of FIG. 3 and the battery 2 is very long and a long wire-harness having a large inductance is required therebetween, the switching noise can be suppressed when the output MOS transistor 11 is turned ON and OFF.

Figure 4:
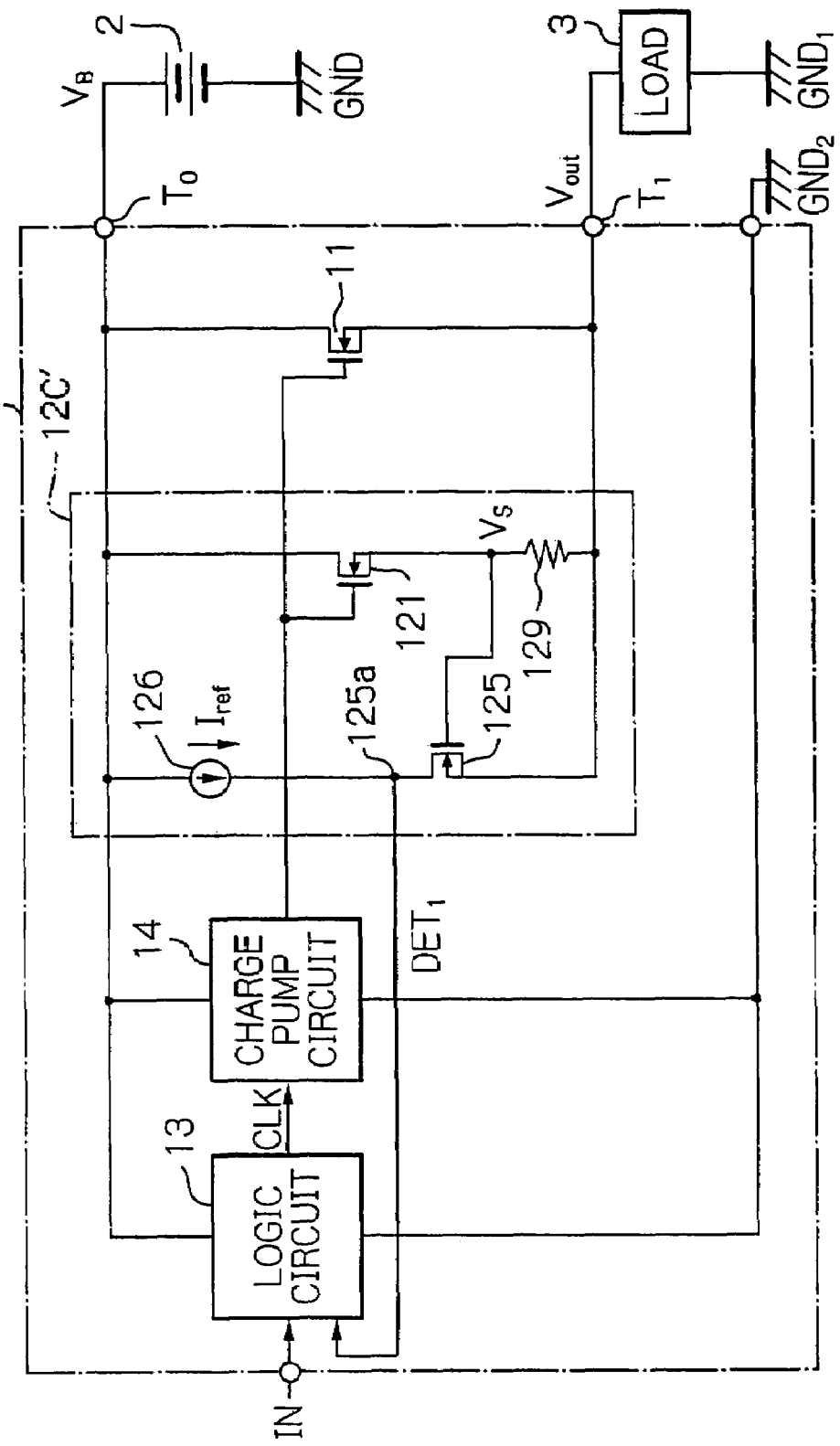
FIG. 4 is a circuit diagram of a modification of the power supply control apparatus of FIG. 3.

In FIG. 4, which illustrates a modification of the power supply control apparatus of FIG. 3, the overcurrent detecting circuit 12C of FIG. 3 is modified to an overcurrent detecting circuit 12C' where the MOS transistor 124 and the constant current source 130 of FIG. 3 are deleted, and the gate of the MOS transistor 125 is controlled directly by the source voltage VS of the current detecting MOS transistor 121. In this case, the resistance of the reference resistor 129 is larger in FIG. 4 than in FIG. 3. As a result, in an activated state of the charge pump circuit 14, when a short-circuited state occurs between the output terminal $T_1$ and the ground terminal $T_2$ or within the load 3, the voltage drop of the reference resistor 129 becomes about 0.4 to 1.0V, for example, higher than the threshold voltage of the MOS transistor 125, thus sufficiently turning ON the MOS transistor 125. Therefore, although the precision of overcurrent detection is deteriorated as compared with the overcurrent detecting circuit 12C of FIG. 3, the other effects of the overcurrent detecting circuit 12C of FIG. 3 can be expected.

In FIGS. 3 and 4, note that the transistors 11, 121, 124 and 125 are enhancement-type N-channel MOS transistors.

Figure 5A:
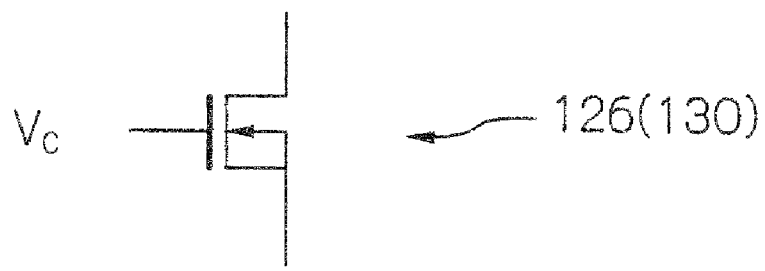
FIGS. 5A, 5B and 5C are detailed circuit diagrams of the constant current sources of FIGS. 3 and 4.

In FIG. 5A, which is a detailed circuit diagram of the constant current source 126 (130) of FIGS. 3 and 4, the constant current source 126 (130) is formed by an enhancement-type N-channel MOS transistor whose gate receives a constant voltage $V_C$.

Figure 5B:
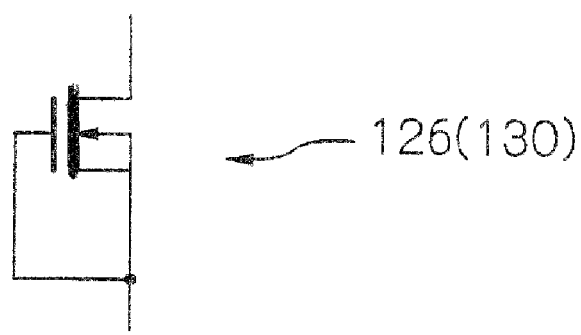

In FIG. 5B, which is another detailed circuit diagram of the constant current source 126 (130) of FIGS. 3 and 4, the constant current source 126 (130) is formed by a depletion type MOS transistor whose gate is connected to the source thereof.

Figure 5C:
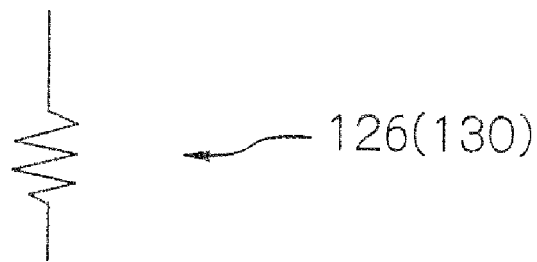

In FIG. 5C, which is a further detailed circuit diagram of the constant current source 126 (130) of FIGS. 3 and 4, the constant current source 126 (130) is formed by a resistor.

Figure 6:
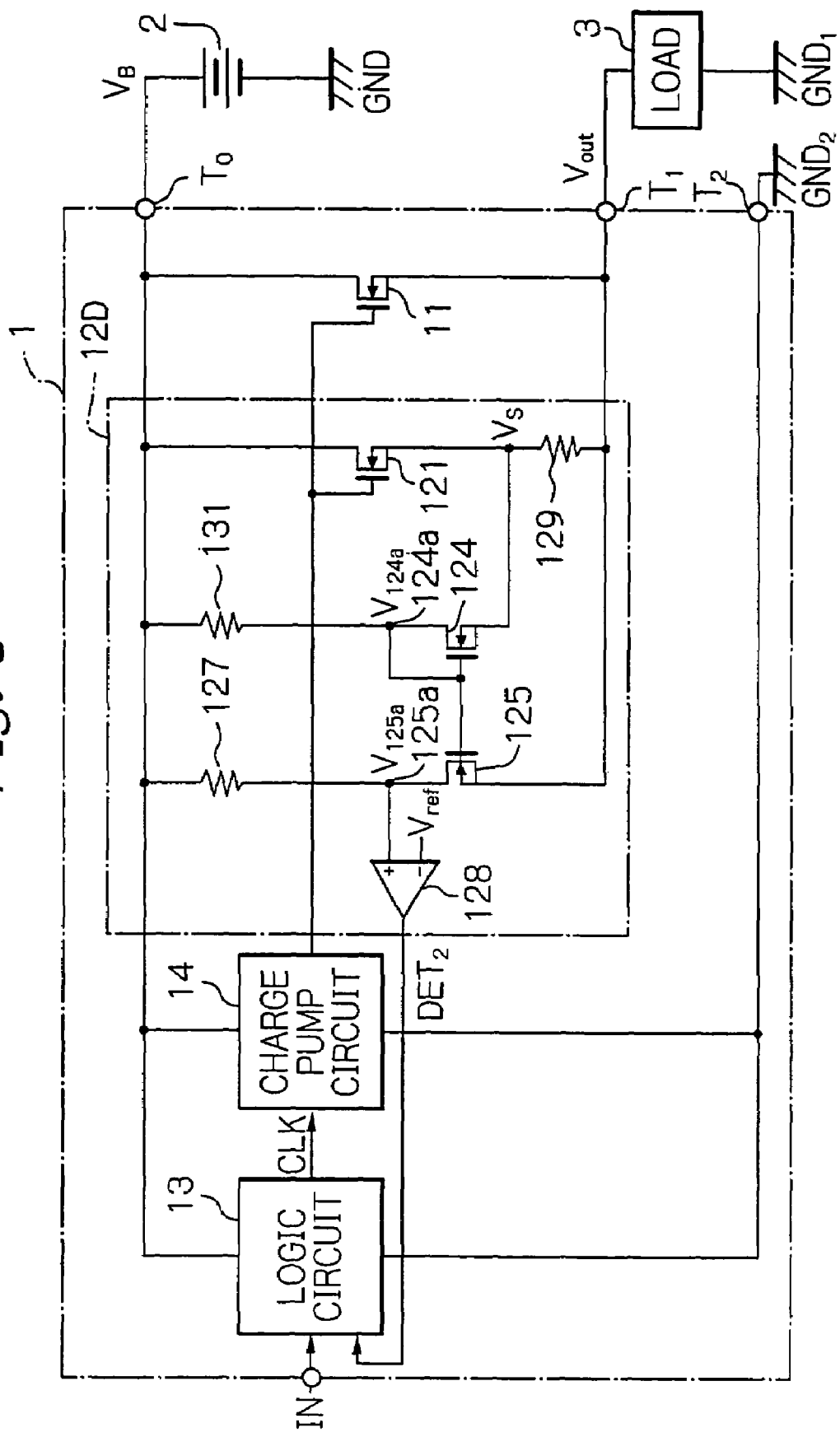
FIG. 6 is a circuit diagram illustrating a second embodiment of the power supply control apparatus according to the present invention.

In FIG. 6, which illustrates a second embodiment of the power supply control apparatus according to the present invention, the overcurrent detecting circuit 12B of FIG. 2 is replaced by an overcurrent detecting circuit 12D which is connected between the battery terminal $T_0$ and the output terminal $T_1$.

In the overcurrent detecting circuit 12D, the control MOS transistor 122 and the operational amplifier 123 of FIG. 2 are deleted, and a reference resistor 129 is connected between the current detecting MOS transistor 121 and the output terminal $T_1$. Also, a resistor 131 is connected to the battery terminal $T_0$, and the MOS transistor 124 of FIG. 1 is connected between the resistor 131 and the reference resistor 129. Also, the source of the MOS transistor 125 is connected to the output terminal $T_1$.

In the overcurrent detecting circuit 12C, the current flowing through the current detecting MOS transistor 121 is subject to an error caused by a voltage drop of the reference resistor 129. Note that, the smaller this voltage drop, the smaller the error of the current flowing through the current detecting MOS transistor 121. In this case, it is desirable that this voltage drop is less than 0.5V.

Even in the current mirror circuit formed by the MOS transistors 124 and 125, in order for the current flowing through the MOS transistor 124 to be equal to the current flowing through the MOS transistor 125, W/L:W0/L0=1:1, and $I_{ref} > I_{ref0}$ where W0 and W are the gate width of the MOS transistors 124 and 125, respectively;

L0 and L are the gate lengths of the MOS transistors 124 and 125, respectively; and $I_{ref0}$ and $I_{ref}$ are the currents of the constant current sources 130 and 129, respectively.

Otherwise, $I_{ref} = I_{ref0}$, and

W/L<W0/L0

As a result, if the current flowing through the MOS transistor 124 is 1 mA, the current flowing through the MOS transistor 125 is also 1 mA.

The operation of the power supply control apparatus 1 of FIG. 6 is explained next.

In a deactivated state of the charge pump circuit 14, no current flows through the output MOS transistor 11 and the current detecting MOS transistor 121. Therefore, no current flows through the reference resistor 129 so that the source voltage $V_S$ of the current detecting MOS transistor 121 does not rise, and thus, the voltage $V_{124a}$ at the input 124a of the current mirror circuit does not rise. As a result, the voltage $V_{125a}$ at the output 125a of the current mirror circuit (124, 125) becomes $$V_{125a}=V_B>V_{ref}$$

Therefore, the overcurrent detecting signal $DET_2$ becomes "1" (high level).

In an activated state of the charge pump circuit 14, if no short-circuited state occurs between the output terminal $T_1$ and the ground terminal $T_2$ or within the load 3, a normal current such as 1 A flows through the output MOS transistor 11, so that a normal detecting current such as 1 mA flows through the current detecting MOS transistor 121, and the reference resistor 129. Thus, the source voltage $V_S$ of the current detecting MOS transistor 121 and the voltage $V_{124a}$ at the input of the current mirror circuit rise. In this case, however, the current flowing through the MOS transistor 125 does not exceed 1.1 mA. For example, this current is 1.0 mA. As a result, the voltage $V_{125a}$ at the output 125a of the current mirror circuit (124, 125) becomes $$V_{125a}=V_B-1.0\ mA \cdot R_{ref}>V_{ref}.$$

Therefore, the overcurrent detecting signal $DET_2$ also becomes "1" (high level).

In an activated state of the charge pump circuit 14, if a short-circuited state occurs between the output terminal $T_1$ and the ground terminal $T_2$ or within the load 3, an abnormal current such as 1.2 A flows through the output MOS transistor 11, so that an abnormal detecting current such as 1.2 mA flows through the current detecting MOS transistor 121 and the reference resistor 129. Thus, the source voltage $V_S$ of the current detecting MOS transistor 121 and the voltage $V_{124a}$ at the input of the current mirror circuit rise. In this case, the current flowing through the MOS transistor 125 exceeds 1.1 mA. As a result, the voltage $V_{125a}$ at the output 125a of the current mirror circuit (124, 125) becomes $$V_{125a}=V_g-1.2\ mA \cdot R_{ref}<V_{ref}$$

Therefore, the overcurrent detecting signal $DET_2$ becomes "0" (low level). In this case, the logic circuit 13 stops supplying the clock signal CLK, to deactivate the pump charge circuit 14, thus turning OFF the output MOS transistor 11 and the current detecting MOS transistor 121.

In the power supply control apparatus 1 of FIG. 6, when the logic circuit 13, the charge pump circuit 14 and the like are operated, a current may be supplied therefrom via the ground terminal $T_2$ to the ground $GND_2$. Even in this case, the source voltages of the MOS transistors 124 and 125 are the same or close to the output voltage $V_{out}$ at the output terminal $T_1$. Thus, the overcurrent detecting circuit 12D could be surely operated.

Also, a current $I_{DET}$ of the overcurrent detecting signal $DET_2$ depends on a square root of the ratio of the reference voltage $V_{ref}$ to the resistance $R_{ref}$ of the reference resistor 127, i.e., $$I_{DET}=(\alpha/R_{ref})\cdot\{((V_{ref}/(V_B-V_{out}-V_{gs}(124))\cdot R(131)/R_{ref})\cdot(W0/L0)/(W/L))^{1/2}-1\}\cdot\{V_{gs}(124)-V_{th}(124)\} \quad (4)$$

where R(131) is the resistance of the resistor 131;
$V_{gs}(124)$ is the gate-to-source voltage of the MOS transistor 124; and
$V_{th}(124)$ is the threshold voltage of the MOS transistor 124.

In this case, $$V_{gs}(124) \propto (I_{ref0})^{1/2}$$

Therefore, the equation (4) is approximated to $I_{DET} \propto (I_{ref0})^{1/2}$.

Thus, even if the resistance $R_{ref}$ of the reference resistor 127 fluctuates, a high precision overcurrent detection can be obtained.

Further, since the operational amplifier 123 of FIG. 2 is not provided, the power supply control apparatus 1 of FIG. 6 can be small in size and low in manufacturing cost.

Additionally, since the overcurrent detecting signal $DET_2$ does not require a feedback operation using the operational amplifier 123, the overcurrent detecting signal $DET_2$ is not subject to the battery voltage $V_B$. Therefore, even if the distance between the power supply control apparatus 1 of FIG. 6 and the battery 2 is very long and a long wire-harness having a large inductance is required therebetween, the switching noise can be suppressed when the output MOS transistor 11 is turned ON and OFF.

Figure 7:
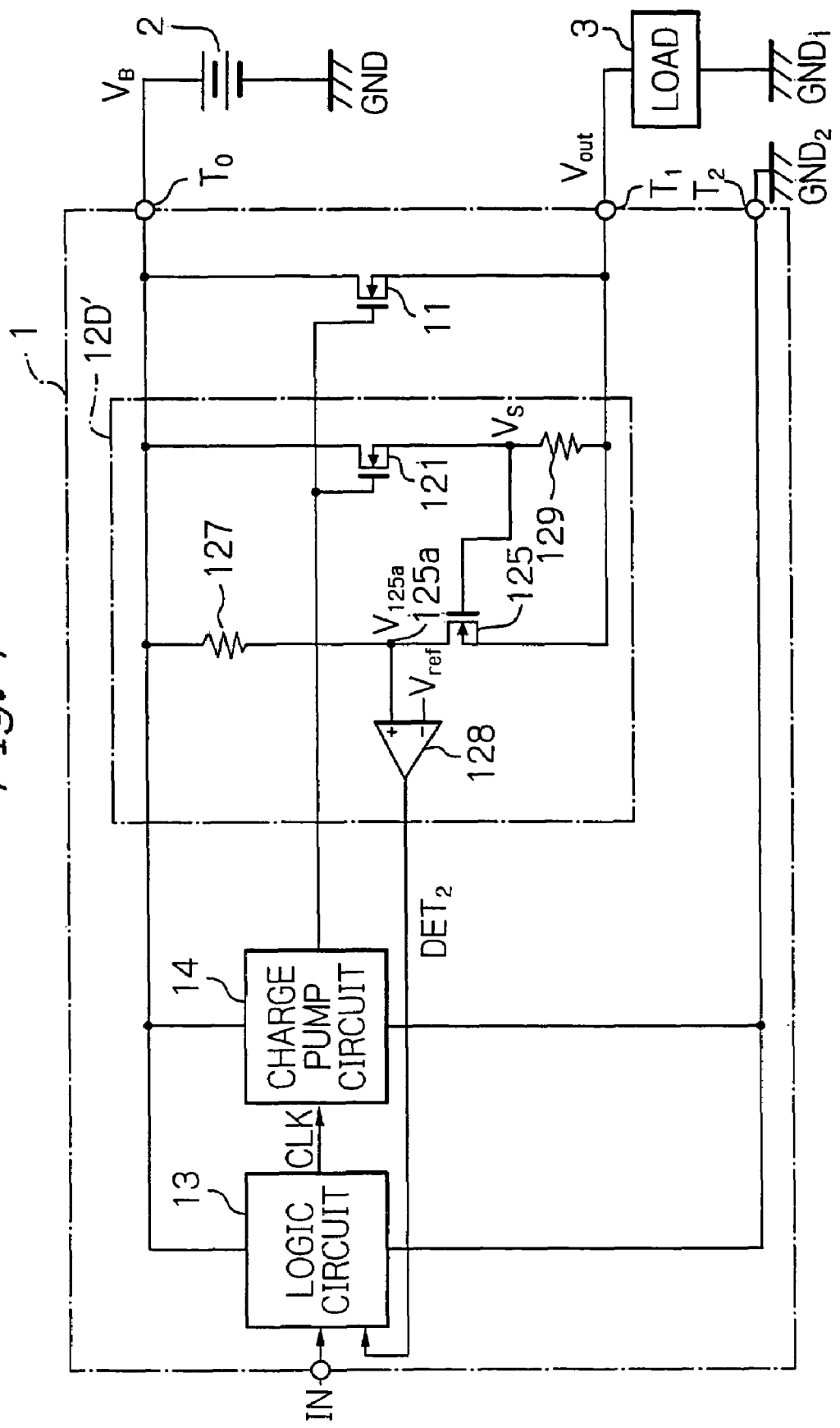
FIG. 7 is a circuit diagram of a modification of the power supply control apparatus of FIG. 6.
Figure 8:
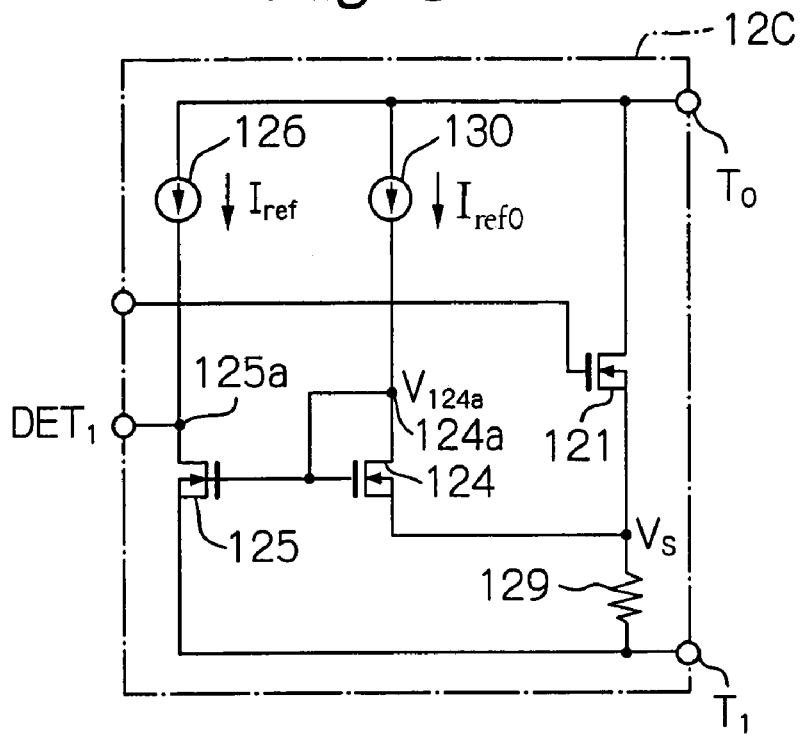
FIGS. 8, 9, 10 and 11 are circuit diagrams of modifications of FIGS. 3, 4, 6 and 7, respectively, where the overcurrent detecting circuit is formed by one individual device.
Figure 9:
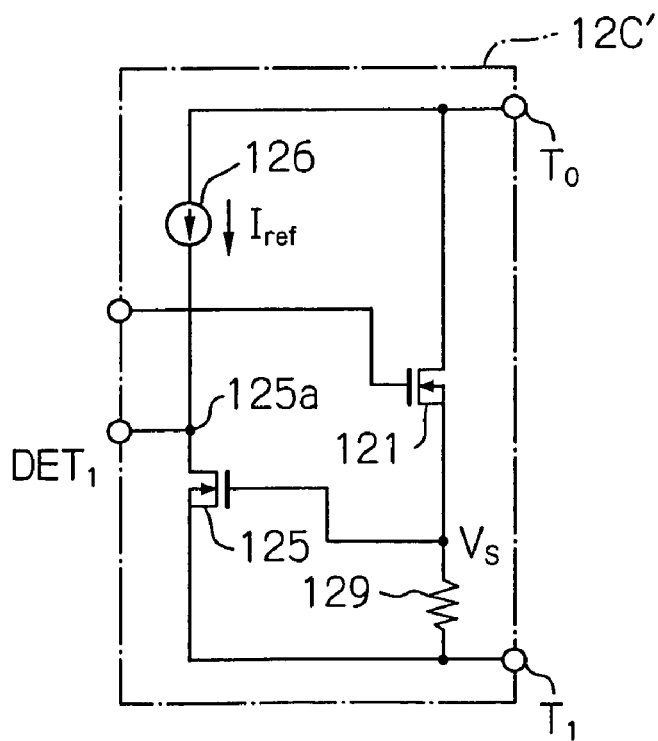
Figure 10:
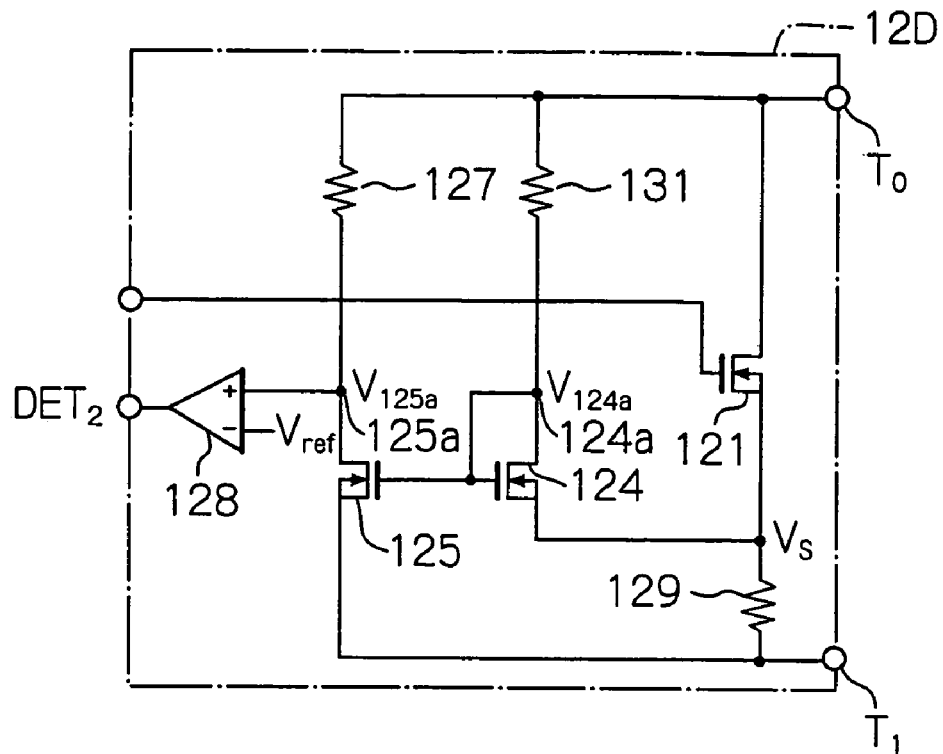
Figure 11:
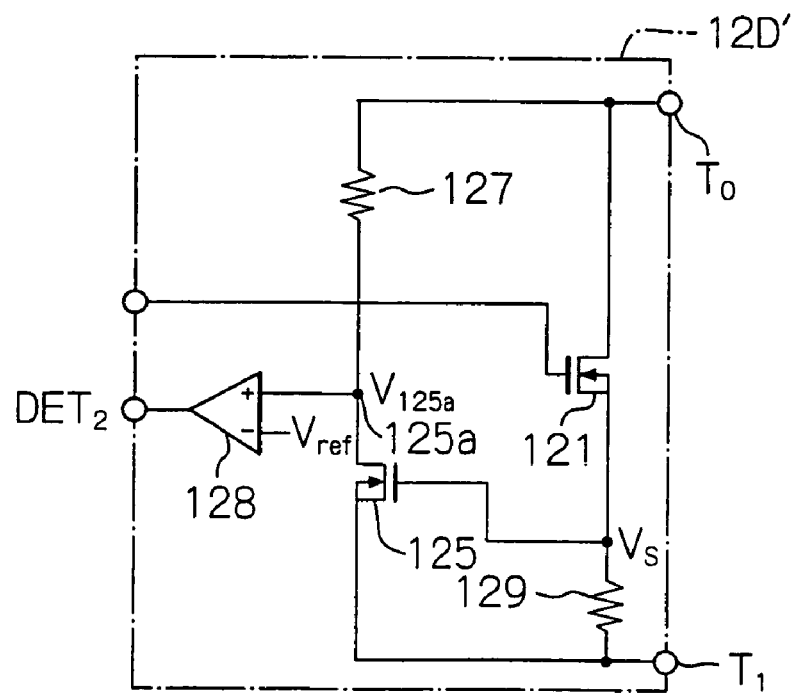

In FIG. 7, which illustrates a modification of the power supply control apparatus of FIG. 6, the overcurrent detecting circuit 12D of FIG. 6 is modified to an overcurrent detecting circuit 12D' where the MOS transistor 124 and the resistor 131 of FIG. 6 are deleted, and the gate of the MOS transistor 125 is controlled directly by the source voltage $V_S$ of the current detecting MOS transistor 121. In this case, the resistance of the reference resistor 129 is larger in FIG. 7 than in FIG. 6. As a result, in an activated state of the charge pump circuit 14, when a short-circuited state occurs between the output terminal $T_1$ and the ground terminal $T_2$ or within the load 3, the voltage drop of the reference resistor 129 becomes about 0.4 to 1.0V, for example, higher than the threshold voltage of the MOS transistor 125, thus sufficiently turning ON the MOS transistor 125. Therefore, although the precision of overcurrent detection is deteriorated as compared with the overcurrent detecting circuit 12D of FIG. 6, the other effects of the overcurrent detecting circuit 12D of FIG. 6 can be expected.

In FIGS. 6 and 7, note that the transistors 11, 121, 124 and 125 are enhancement-type N-channel MOS transistors.

In the above-described embodiments, the N-channel MOS transistors can be formed by other transistors such as PNP-type bipolar transistor.

Also, in the above-described embodiments, each of the overcurrent detecting circuits 12C, 12C', 12D and 12D' is integrated into the power supply control apparatus 1; however, each of the overcurrent detecting circuits 12C, 12C', 12D and 12D' can be formed by one individual device as illustrated in FIGS. 8, 9, 10 and 11, respectively.

As explained hereinabove, according to the present invention, since the overcurrent detecting circuit is connected between the battery terminal and the output terminal, the overcurrent detecting circuit can be surely operated. Also, a high precision overcurrent detection can be obtained. Further, the power supply control apparatus can be small in size and low in manufacturing cost. Additionally, the switching noise can be suppressed.

The invention claimed is:

1. A power supply control apparatus comprising:
a power supply terminal;
an output terminal;
a first MOS transistor of a first channel type connected between the power supply terminal and the output terminal and having a gate supplied with a control signal;
a second MOS transistor of the first channel type connected between the power supply terminal and a first circuit node and having a gate supplied with the control signal;
a resistor connected between the first circuit node and the output terminal;
a third MOS transistor of the first channel type connected between the first circuit node and a second circuit node and having a gate connected to the second circuit node, a potential at the second circuit node varying in conjunction with a voltage difference between the first circuit node and the output terminal;

a first current source connected between the power supply terminal and the second circuit node;

a fourth MOS transistor of the first channel type connected between the output terminal and a third circuit node and having a gate connected to the second circuit node; and a second current source connected between the power supply terminal and the third circuit node.

2. The apparatus as claimed in claim 1, wherein the first channel type is an N channel type, a drain and a source of the first MOS transistor being connected respectively to the power supply terminal and the output terminal, and a drain and a source of the second MOS transistor being connected respectively to the power supply terminal and the resistor.

3. The apparatus as claimed in claim 2, wherein an overcurrent detection signal is derived from the third circuit node.

4. The apparatus as claimed in claim 3, wherein each of the first and second current sources comprises an MOS transistor supplied at a gate with a bias voltage.

5. The apparatus as claimed in claim 3, wherein each of the first and second current sources comprises an MOS transistor of a diode-connected type.

6. The apparatus as claimed in claim 3, wherein each of the first and second current sources comprises a resistor.

7. The apparatus as claimed in claim 3, wherein the overcurrent detection signal is generated independently of the control signal.

8. The apparatus as claimed in claim 1, wherein the third circuit node is not connected to the gate of the first MOS transistor.

9. The apparatus as claimed in claim 1, wherein a gate-to-source voltage of the third MOS transistor is stabilized toward the voltage difference between the first circuit node and the output terminal, and gate-to-source voltage of the fourth MOS transistor varies in conjunction with the voltage difference between the first circuit node and the output terminal.

* * * * *

UNITED STATES PATENT AND TRADEMARK OFFICE
CERTIFICATE OF CORRECTION

PATENT NO. : 7,626,792 B2  Page 1 of 1
APPLICATION NO. : 10/885045
DATED : December 1, 2009
INVENTOR(S) : Tsuyoshi Mitsuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 286 days.

Signed and Sealed this

Twenty-first Day of December, 2010

David J. Kappos
*Director of the United States Patent and Trademark Office*